Aug. 18, 1931.　　　A. KÉGRESSE　　　1,819,178
MOTOR CAR BONNET AND RADIATOR MOUNTING DEVICE
Filed Oct. 11, 1927　　2 Sheets-Sheet 1
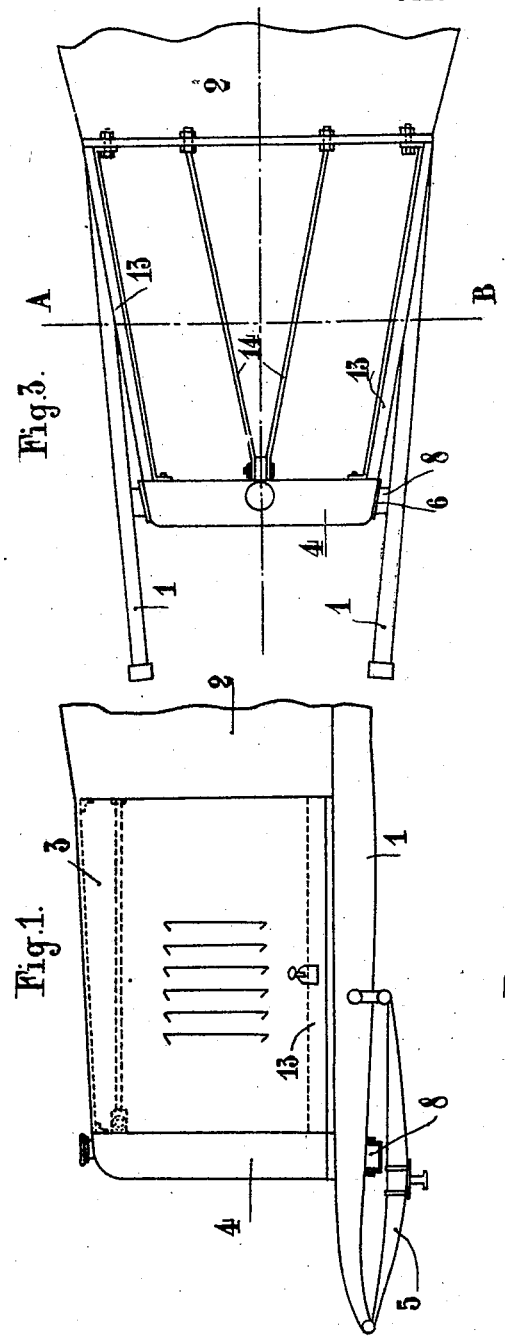
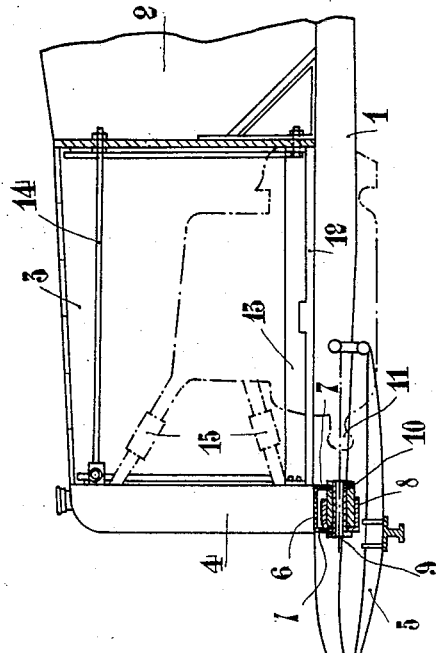
INVENTOR:
Adolphe Kégresse
BY
ATTORNEY Aug. 18, 1931.  A. KÉGRESSE  1,819,178
MOTOR CAR BONNET AND RADIATOR MOUNTING DEVICE
Filed Oct. 11, 1927  2 Sheets-Sheet 2
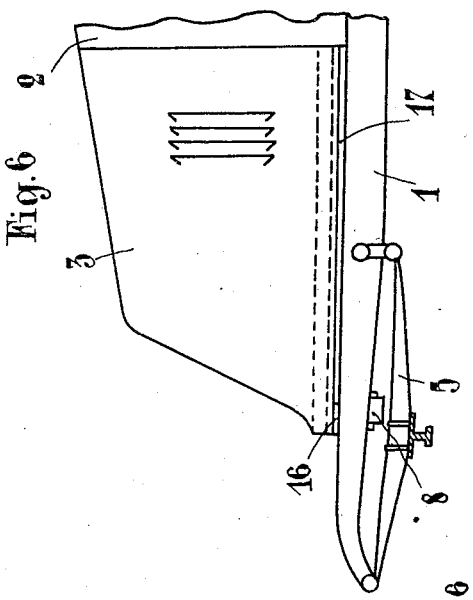
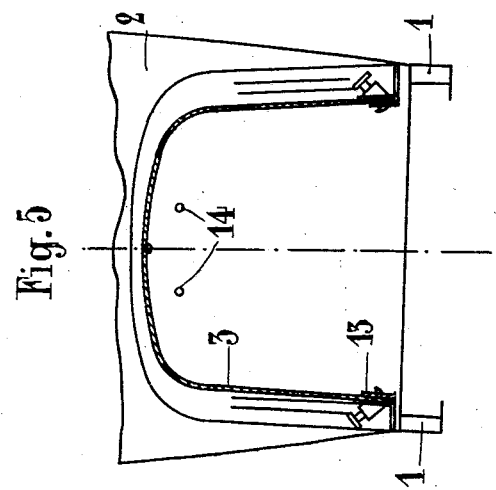
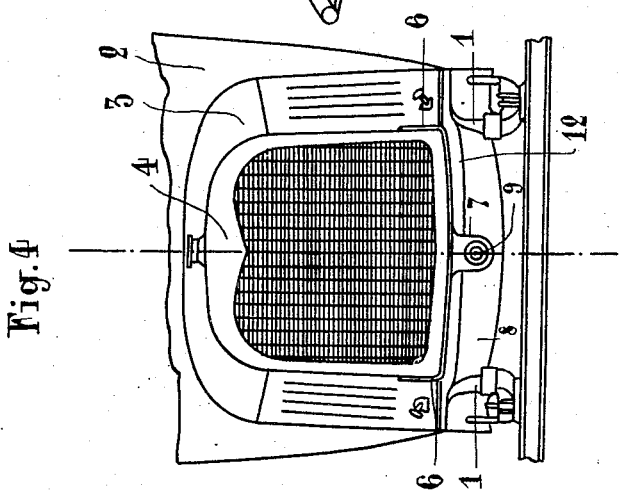
INVENTOR:
Adolphe Kégresse
BY
ATTORNEY Patented Aug. 18, 1931

1,819,178

UNITED STATES PATENT OFFICE

ADOLPHE KÉGRESSE, OF LEVALLOIS PERRET, FRANCE

MOTOR-CAR BONNET AND RADIATOR MOUNTING DEVICE

Application filed October 11, 1927, Serial No. 225,531, and in France October 15, 1926.

In all motor-cars the bonnet of the engine rests upon the cowl, on the one hand, and, on the other hand, upon the rim of the radiator when the latter is mounted in front, being secured directly to the side members of the chassis frame with, occasionally, some resilient device in between.

In cars or vehicles where the radiator is not in front, the bonnet of the engine simply rests upon the longitudinal bearers of the chassis frame, with a wooden or metal base set in between.

Now, as is well known, the side members possess some degree of resiliency. Influenced by the bumps in the road over which the car is running, the said members flex and thereby set up stresses or strains throughout the entire chassis which are transmitted to the parts fixed thereon, that is to say to the radiator, the bonnet and the body.

These strains often amount to a positive twisting of the whole chassis, the consequence being that the radiator and the body, located some distance from one another, are subjected to the action of forces of different magnitudes and in different directions. The bonnet, which connects the radiator and the body, is therefore also subjected to stresses or strains of different magnitudes and in different directions, since it is engaged at one end with the radiator, and at the other end with the cowl of the body.

This accounts for the fact that it is very difficult, if not impossible, to obtain positive steadiness of the bonnet and of the radiator with respect to each other and to the body.

The object of my invention is to provide a mounting for the radiator and the bonnet designed to render them independent of the flexures of the corresponding portion of the chassis and rigid with the cowl of the body.

In order to make my invention clearly understood I have illustrated, as an example, an embodiment thereof in the appended drawings, wherein:

Figure 1 is a side elevation of said embodiment;

Figure 2 is a vertical section through the axis of the radiator;

Figure 3 is a plan view with the bonnet removed;

Figure 4 is a front view;

Figure 5 is a transverse vertical section along line A—B of Figure 3; and

Figure 6 is an elevation showing a device according to my invention applied to a motor-car having no radiator in front.

In all the figures, 1 denotes the chassis of the vehicle, 2 the cowl of the body, 3 the bonnet, 4 the radiator and 5 the front springs.

The lower part of the radiator is fitted with a special attaching strap 6 (Figures 2, 3 and 4) having two ears 7 mounted astride the front cross-piece 8 of the frame. A pivot spindle 9, secured to the ears 7 is mounted in a bushing 10 fixed for this purpose inside cross-piece 8 of chassis 1.

Spindle 9 is in line with the axis of the engine whereon is situated the ball-and-socket fastening 11 of the front of the engine, in the case where the engine has a three-point attachment (as shown on Figure 2); and it may be hollow so as to enable the starting handle to be passed through it.

Between the base of the radiator and the cross-piece 8, a clearance 12 (Figure 4) is provided which permits of the radiator oscillating to a degree transversely of the side members of the chassis frame.

The base of the radiator 4 is connected at opposite sides with the cowl 2 by means of two pressed sheet-metal cross-ties 13 (Figures 1, 2 and 3) so arranged as to leave some clearance between themselves and the chassis 1. Said cross-ties 13 are rigidly connected at one end, with the bottom of the cowl and at the other end with the base of the radiator 4. The bonnet 3 rests upon the edge of the cowl and upon the rim 4 and it is hooked to the two cross-ties 13 without being itself seated on the chassis.

The upper part of the radiator may be connected with the cowl by means of one or two ties 14 (Figures 2 and 3) which may be made of steel wire, tubing or swaged metal, and either cross-braced or not.

With three-point hung engines in which the attachment to the chassis is effected in 10 front by means of a ball-and-socket joint, the ties are unnecessary, the water unions 15 (Figure 2) affording sufficient connection since the radiator and the engine are mounted on one and the same axis.

In cars where the radiator is not in front, I provide a frame 16 (Figure 6) serving as a bearing base for the bonnet, which frame is secured at the rear to the bottom of cowl 2 and has its front portion supported centrally by a lug with ears astride the crosspiece 8, in the same manner as the base of the radiator in the first case.

Between frame 16 and chassis 1, I provide a certain clearance 17 so that the bonnet is thus secured directly on said frame 16, which itself rests upon the chassis only at its oscillating front.

Consideration of the behaviour of such an arrangement, say when travelling over a rough road, will show that:

1st. As concerns cars with the radiator in front, the twistings of the chassis, which take place around the longitudinal axis thereof, are transmitted neither to the radiator nor to the bonnet. As a matter of fact, the radiator contacts with the chassis only through its articulation and is, therefore, unaffected by the torsional movement of the chassis. The bonnet, resting upon the cowl and the radiator, is secured to crossties 13; therefore, it too does not contact with the chassis and, consequently, cannot be affected by the latter's deformations.

2nd. As concerns cars in which the radiator is not in front, the bonnet rests upon a bearing base which, maintained at some distance from the chassis, is secured to the cowl and, on the opposite side, is articulated to the longitudinal axis of the car; it is, therefore, unaffected by any twistings of the chassis.

I claim as my invention:

1. In a vehicle, the combination with a supporting frame, a body, a radiator, and a hood mounted thereon, of means for supporting said radiator and hood on said supporting frame so as to be independent of any weaving movement thereof, comprising a pivotal support on said supporting frame for supporting said radiator substantially intermediate the sides thereof, a pair of tie rods having their forward ends connected to the upper portions of said radiator substantially centrally thereof and extending rearwardly to the opposite sides of said body, a pair of lower rods with their ends connecting with the sides of said body and the lower side portions of said radiator, and means for securing the said hood upon said lower tie rods.

2. In a vehicle, the combination with a supporting frame, a body, a radiator, and a hood mounted thereon, of means for supporting said radiator and hood on said supporting frame so as to be independent of any weaving movement thereof, comprising a pivotal support on said supporting frame for supporting said radiator substantially intermediate the sides thereof, a pair of tie rods having their forward ends connected to the upper portions of said radiator substantially centrally thereof and extending rearwardly to the opposite sides of said body, a pair of lower rods with their ends connecting with the sides of said body and the lower side portions of said radiator, and latch members adapted to removably connect the lower sides of said hood with the respective lower rods for detachably securing said hood on said radiator and body.

In testimony whereof I affix my signature.

ADOLPHE KÉGRESSE.